United States Patent
Chang et al.

(10) Patent No.: US 10,555,200 B2
(45) Date of Patent: *Feb. 4, 2020

(54) RADIO MEASUREMENT COLLECTION METHOD AND RADIO TERMINAL

(71) Applicant: KYOCERA CORPORATION, Kyoto (JP)

(72) Inventors: Henry Chang, San Diego, CA (US); Noriyoshi Fukuta, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 131 days.

This patent is subject to a terminal disclaimer.

(21) Appl. No.: 15/943,384

(22) Filed: Apr. 2, 2018

(65) Prior Publication Data

US 2018/0227788 A1    Aug. 9, 2018

Related U.S. Application Data

(63) Continuation of application No. 15/049,405, filed on Feb. 22, 2016, now Pat. No. 9,936,413, which is a continuation of application No. 14/470,717, filed on Aug. 27, 2014, now Pat. No. 9,301,189, which is a continuation of application No. 13/209,037, filed on Aug. 12, 2011, now Pat. No. 8,854,979.

(Continued)

(51) Int. Cl.
*H04W 24/10* (2009.01)
*H04W 88/08* (2009.01)

(52) U.S. Cl.
CPC ............ *H04W 24/10* (2013.01); *H04W 88/08* (2013.01)

(58) Field of Classification Search
CPC .............................. H04W 24/10; H04W 88/08
See application file for complete search history.

(56) References Cited

U.S. PATENT DOCUMENTS

2004/0156350 A1    8/2004   Brasie et al.
2009/0257353 A1    10/2009  Song et al.
(Continued)

FOREIGN PATENT DOCUMENTS

JP          5010764 B2     6/2012

OTHER PUBLICATIONS

Japanese Office Action; JP2012-505530; dated Apr. 24, 2012.
(Continued)

*Primary Examiner* — Ian N Moore
*Assistant Examiner* — Justin T Van Roie
(74) *Attorney, Agent, or Firm* — Studebaker & Brackett PC

(57) ABSTRACT

A radio base station is operable to transmit to a radio terminal a measurement configuration message for causing the radio terminal to perform a logging process of storing a measurement log including a measurement result of a radio environment, and to acquire the measurement log stored by the radio terminal. The radio base station includes a receiver configured to receive, from the radio terminal, log storing information indicating that the measurement log is stored in the radio terminal, and a transmitter configured to transmit, to the radio terminal, a log transmission request to request a transmission of the measurement log on the basis of the log storing information. The receiver is configured to receive, from the radio terminal, a log transmission response for carrying the measurement log and the log transmission response even when the measurement log is not stored in the radio terminal.

6 Claims, 9 Drawing Sheets

Related U.S. Application Data

(60) Provisional application No. 61/373,525, filed on Aug. 13, 2010.

(56) References Cited

U.S. PATENT DOCUMENTS

| | | |
|---|---|---|
| 2011/0009116 A1 | 1/2011 | Moberg et al. |
| 2011/0199923 A1 | 8/2011 | Persson et al. |
| 2011/0201279 A1 | 8/2011 | Suzuki et al. |
| 2011/0306345 A1 | 12/2011 | Wu |
| 2012/0190359 A1 | 7/2012 | Aminaka et al. |
| 2012/0315890 A1 | 12/2012 | Suzuki et al. |
| 2013/0010631 A1 | 1/2013 | Jung et al. |
| 2013/0064120 A1 | 3/2013 | Bodog et al. |
| 2013/0144551 A1 | 6/2013 | Zhou et al. |

OTHER PUBLICATIONS

Notice of Ex Officio Correction of Patent Allowance; JP2012-505530; dated May 16, 2012.

Supplementary European Search Report; EP11811301.8; dated May 2, 2013.

LG Electronics Inc.; 3GPP TSG-RAN2 Meeting #69bis, "Status indication of logged MDT report"; Beijing, P.R. China; Apr. 12-16, 2010, R2-102454.

Ericsson, ST-Ericsson; 3GPP TSG-RAN WG2 #70; "Further details on logged MDT measurement reporting"; Montreal, Canada; May 10-14, 2010; R2-103086, p. 1-6.

NTT Docomo, Inc.; 3GPP TSG-RAN2 #69bis, "Protocol architecture for logged MDT"; Beijing, China; Apr. 12-16, 2010; R2-102453; p. 1-5.

Samsung; 3GPP TSG RAN WG2 #70; "Configuration handling for logged MDT"; Montreal, Canada; May 10-14, 2010; R2-102783; p. 1-3.

3rd Generation Partnership Project; Technical Specification Group Radio Access Network; Study on Minimization of drive-tests in Next Generation Networks; (Release 9); 3GPP TR 36.805 V9.0.0; Dec. 2009.

3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10); 3GPP TS 37.320 V0.7.0; Jun. 2010.

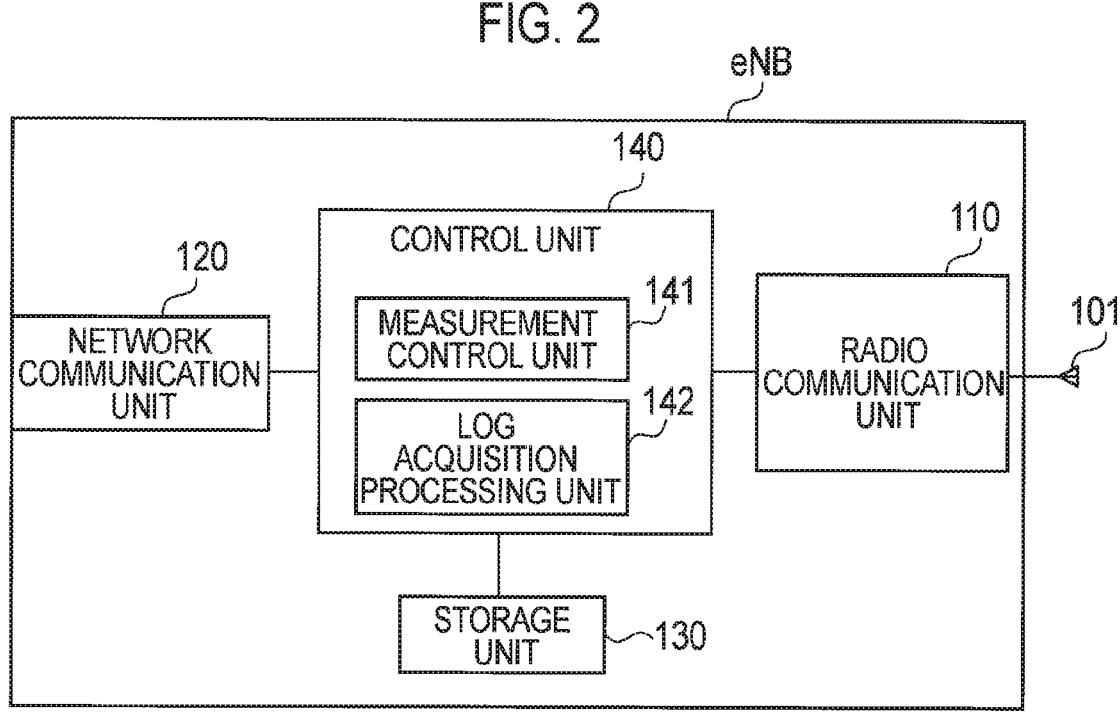
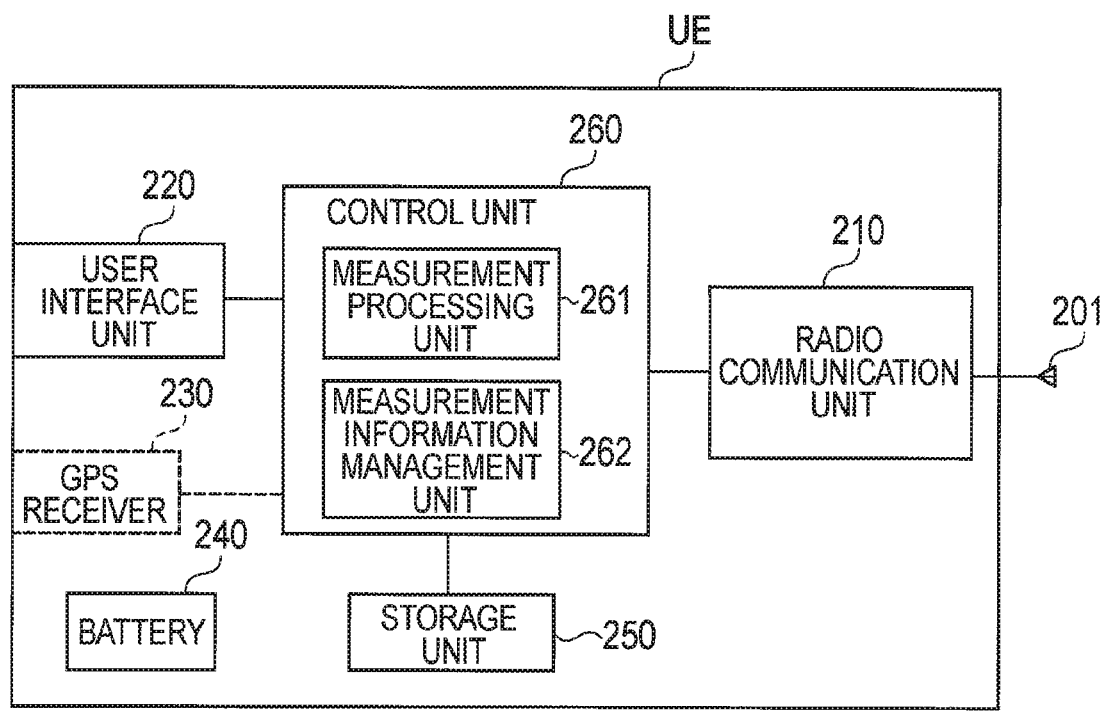

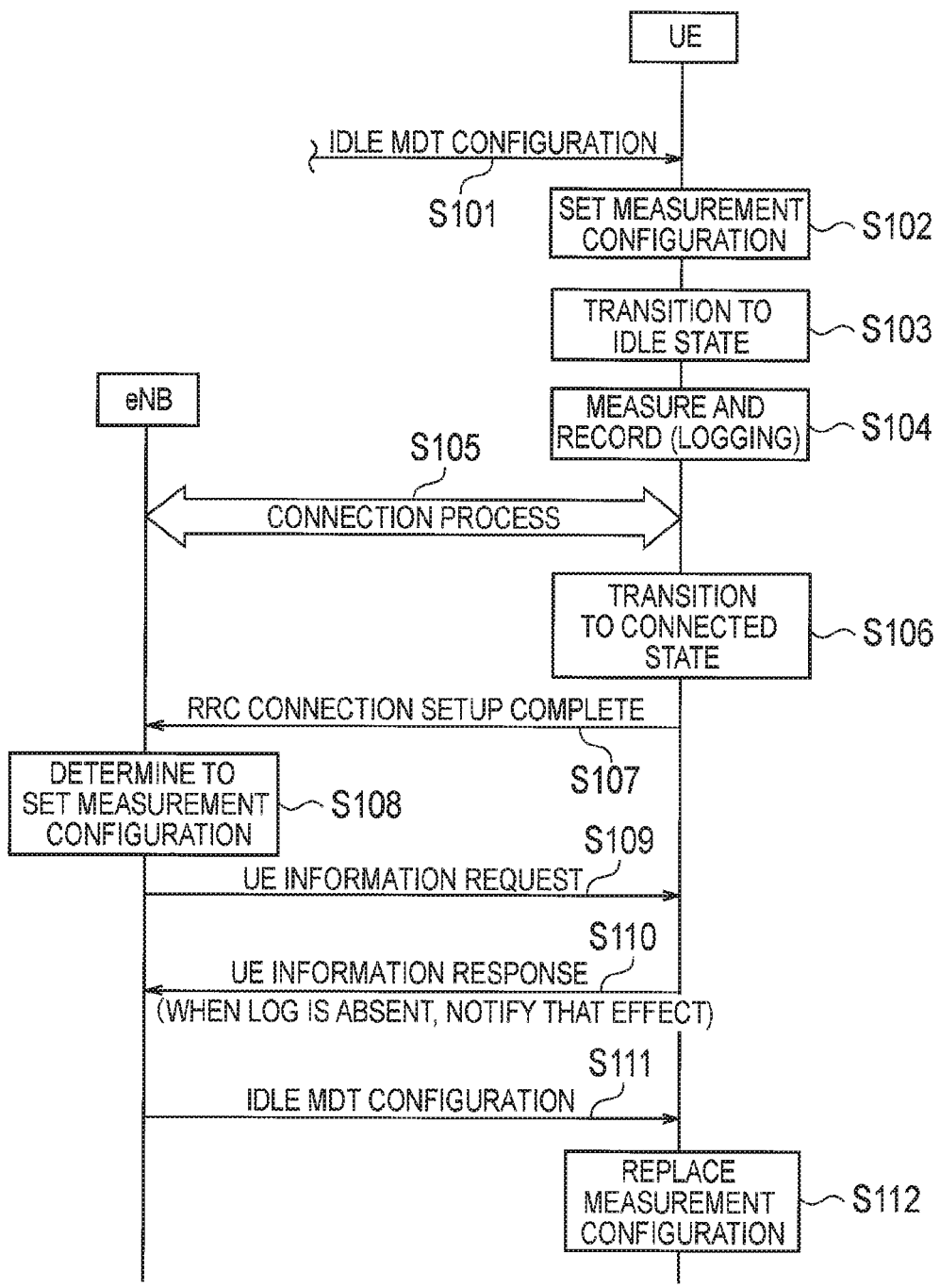

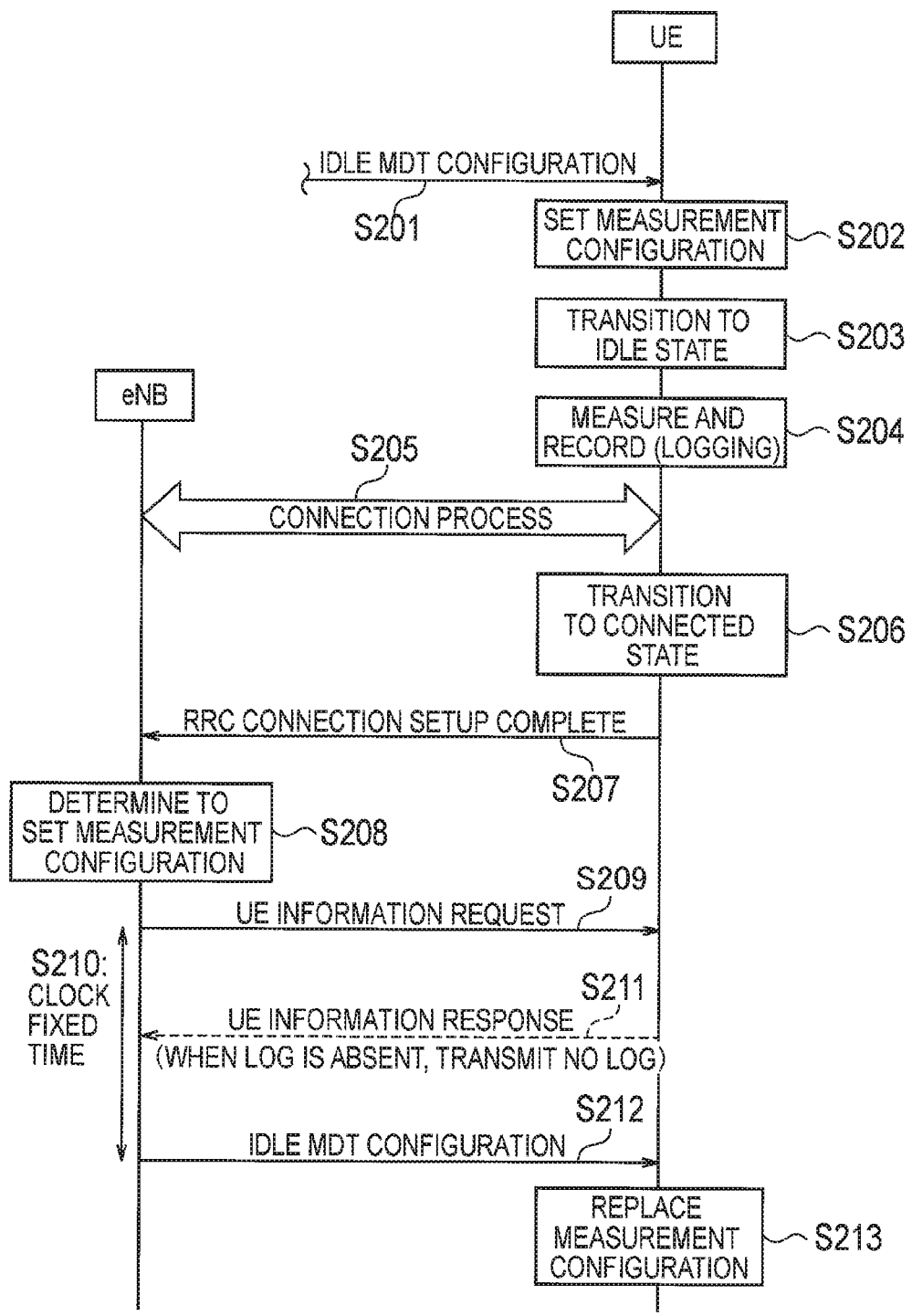

RADIO MEASUREMENT COLLECTION METHOD AND RADIO TERMINAL

CROSS-REFERENCE TO RELATED APPLICATIONS

This application is a continuation of U.S. patent application Ser. No. 15/049,405 filed Feb. 22, 2016, which is a continuation of U.S. application Ser. No. 14/470,717 filed Aug. 27, 2014, which is a continuation of U.S. patent application Ser. No. 13/209,037 filed Aug. 12, 2011, which claims the benefit of U.S. Provisional Patent Application No. 61/373,525 filed Aug. 13, 2010; the entire contents of which are incorporated herein by reference.

BACKGROUND OF DISCLOSURE

1. Field of Disclosure

The present disclosure relates to a radio measurement collection method of measuring and collecting a radio environment, and relates also to a radio terminal.

2. Descriptions of Related Art

In case of mobile communication systems, if a building is constructed on the periphery of a radio base station and if the installation situation of the peripheral base stations of the radio base station changes, then the radio environment related to this radio base station changes. Therefore, conventionally, drive tests to measure and collect the radio environment are carried out by an operator using a measurement vehicle which is installed with a measuring instrument.

Although, these types of measurements and collections of the radio environment can contribute to the optimization of parameters of a radio base station, etc., the man-hours involved are large and there is also a problem of high costs. Accordingly, under the 3GPP (3rd Generation Partnership Project) which is a standardization project of the mobile communication systems, the specification plan of MDT (Minimization of Drive Test) is being promoted. MDT is a technology to automate the measurement and collection of radio environments by using the radio terminals which the user has (see 3GPP TR 36.805 V9.0.0 "Study on Minimization of drive-tests in Next Generation Networks", 2009-12, and 3GPP TS 37.320v0.7.0, "Radio measurement collection for Minimization of Drive Tests (MDT)", 2010-07).

SUMMARY OF DISCLOSURE

It is assumed that the measurement and collection of the radio environment are carried out by using the following methods under a record-type MDT (called "Logged MDT"), which is one of the modes of MDT. Firstly, the network which is configured to include the radio base station transmits a measurement configuration message to the radio terminal to set the measurement configuration (Configuration). Next, in an idle state (in other words, in a standby state), the radio terminal carries out a process (Logging) of retaining a measurement log which includes the measurement results of the radio environment in accordance with the measurement configuration which has been set according to the measurement configuration message received from the network.

Then, the network transmits a log transmission request to request the transmission of the measurement log, to the radio terminal. Afterwards, the radio terminal transmits the log transmission response to transmit the measurement log, to the network. However, the radio terminal is not liable to retaining the measurement log after the lapse of a predetermined time (specifically, 48 hours) after the expiry of the measurement period. Therefore, although there is a possibility that the radio terminal deletes the measurement log after the log transmission request has been received, in reality, since such a situation is not considered, there is a possibility that errors not anticipated on the network side may occur.

Accordingly, the present disclosure provides a radio base station and method performed at a radio base station radio by which it is possible to prevent the occurrence of unanticipated errors on the network side.

In order to solve the problems mentioned above, this disclosure has the following features.

A radio base station according to the present disclosure is operable to transmit to a radio terminal a measurement configuration message for causing the radio terminal to perform a logging process of storing a measurement log including a measurement result of a radio environment, and to acquire the measurement log stored by the radio terminal. The radio base station comprises a receiver configured to receive, from the radio terminal, log storing information indicating that the measurement log is stored in the radio terminal, and a transmitter configured to transmit, to the radio terminal, a log transmission request to request a transmission of the measurement log on the basis of the log storing information. The receiver is configured to receive, from the radio terminal, a log transmission response for carrying the measurement log. The receiver is configured to receive, from the radio terminal, the log transmission response even when the measurement log is not stored in the radio terminal.

A method according the present disclosure is performed at a radio base station operable to transmit to a radio terminal a measurement configuration message for causing the radio terminal to perform a logging process of storing a measurement log including a measurement result of a radio environment, and to acquire the measurement log stored by the radio terminal. The method comprises receiving, from the radio terminal, log storing information indicating that the measurement log is stored in the radio terminal, transmitting, to the radio terminal, a log transmission request to request a transmission of the measurement log on the basis of the log storing information, and receiving, from the radio terminal, a log transmission response for carrying the measurement log. The radio base station receives, from the radio terminal, the log transmission response even when the measurement log is not stored in the radio terminal.

According to another feature of a radio measurement collection method of the present disclosure, there is provided a radio measurement collection method using a radio terminal (e.g. radio terminal UE) configured to perform a process of retaining a measurement log including a measurement result of a radio environment according to a measurement configuration set by a measurement configuration message (e.g. IdleMDTConfiguration message) received from a network (e.g. E-UTRAN), the method comprising: a step A in which the network transmits, to the radio terminal, a log transmission request (e.g. UEInformationRequest message) to request a transmission of the measurement log; and a step B in which the radio terminal transmits, to the network, a log transmission response (e.g. UEInformationResponse message) to transmit the measurement log, wherein in the step B, the radio terminal transmits the log transmission response to the network even when the measurement log is not retained.

According to another feature of the radio measurement collection method of the present disclosure, in the aforementioned feature, the radio terminal transmits the log transmission response to the network even when the measurement log is deleted due to a lapse of a predetermined period after an expiry of a measurement period.

According to another feature of the radio measurement collection method of the present disclosure, in the aforementioned feature, at the time of transition to a connected state from an idle state, the radio terminal transmits, to the network, log retaining information (e.g. Availability Indicator) indicating that the measurement log is retained, and in this step A, the network transmits the log transmission request to the radio terminal on the basis of the log retaining information.

According to another feature of the radio measurement collection method of the present disclosure, in the aforementioned feature, the radio terminal transmits, to the network, a transition completion message (e.g. RRCConnectionSetupComplete message) to the effect that the transition from the idle state to the connected state is completed, and in the step A, the network transmits the log transmission request to the radio terminal which has made transition to the connected state.

According to another feature of the radio measurement collection method of the present disclosure, in the aforementioned feature, the transition completion message includes log retaining information (e.g. Availability Indicator) indicating that the measurement log is retained.

According to a feature of a radio terminal of the present disclosure, there is provided a radio terminal configured to perform a process of retaining a measurement log including a measurement result of a radio environment according to a measurement configuration set by a measurement configuration message received from a network, the radio terminal comprising: a reception unit configured to receive, from the network, a log transmission request to request a transmission of the measurement log; and a transmission unit configured to transmit, to the network, a log transmission response to transmit the measurement log, wherein the transmission unit transmits the log transmission response to the network even when the measurement log is not retained.

BRIEF DESCRIPTION OF DRAWINGS

FIG. 2 is a block diagram showing the configuration of a radio base station eNB.

FIG. 3 is a block diagram showing the configuration of a radio terminal UE.

FIG. 4 is a sequence chart showing a radio measurement collection method according to the first embodiment.

FIG. 5 is a sequence chart showing a radio measurement collection method according to a modification of the first embodiment.

DESCRIPTION OF EMBODIMENTS

Figure 1:
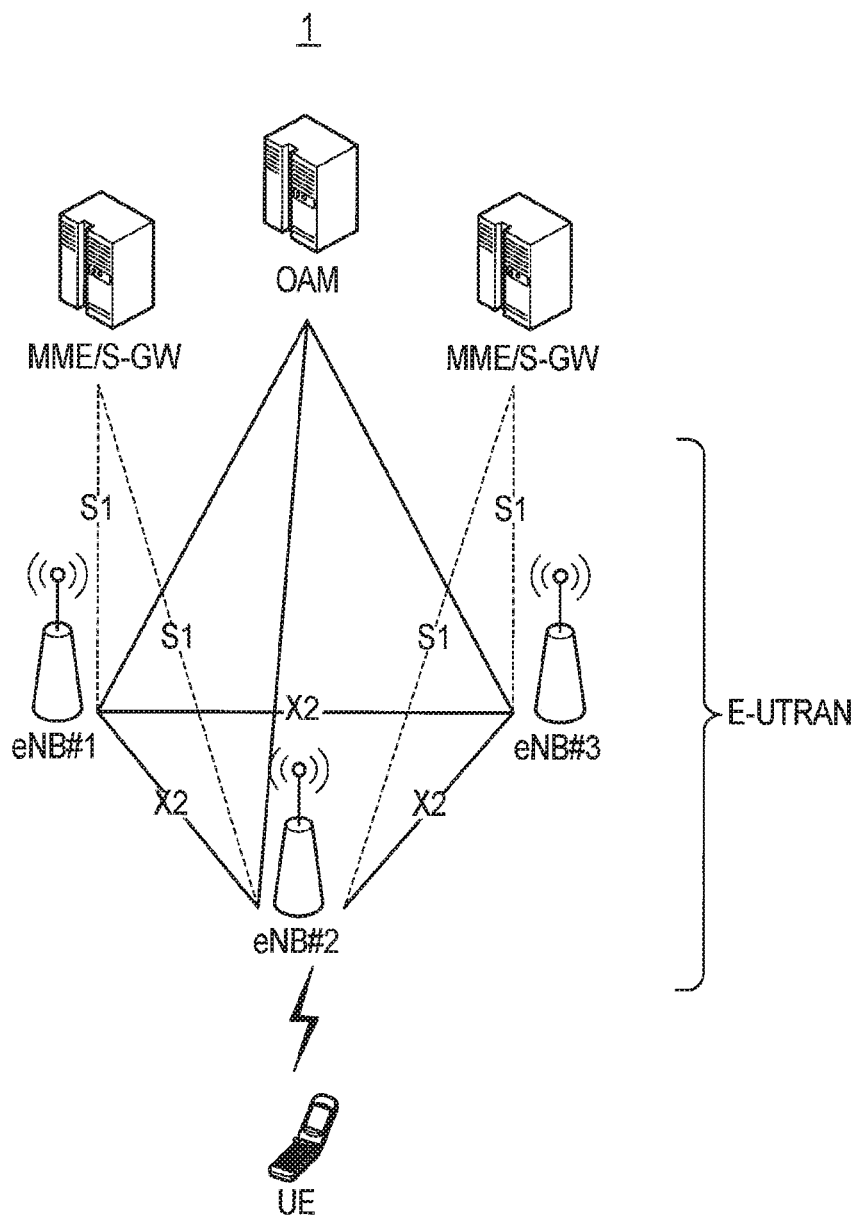
FIG. 1 is a diagram showing an entire schematic configuration of a mobile communication system 1 according to a first embodiment.

With reference to diagrams, a first embodiment, a second embodiment, and other embodiments of the present disclosure are described. Note that in the diagrams in each of the following embodiments, like components are assigned with like reference numerals.

A mobile communication system which is configured based on an LTE (Long Term Evolution)-Advanced whose specifications are designed in the 3GPP is mainly described below. However, it is to be noted that the present disclosure is not limited to the LIE-Advanced and can also be applied to mobile communication systems which are configured based on W-CDMA (Wideband Code Division Multiple Access).

(1) First Embodiment

In the first embodiment, (1.1) Overview of the Mobile Communications System, (1.2) Configuration of Radio Base Station, (1.3) Configuration of Radio Terminal, (1.4) Radio measurement collection method, (1.5) Effects of First Embodiment, and (1.6) Modification of First Embodiment are described.

(1.1) Overview of the Mobile Communications System

FIG. 1 is a diagram showing the entire schematic configuration of the mobile communication system 1 of the first embodiment.

As shown in FIG. 1, the mobile communication system 1 includes: a radio terminal UE (User Equipment); a plurality of radio base stations eNB (evolvedNode-B); a maintenance monitoring device OAM (Operation and Maintenance); and a plurality of mobility management devices MME (Mobility Management Entity)/gateway devices S-GW (Serving Gateway).

The plurality of radio base stations eNB (eNB#1 to eNB#3) configure E-UTRAN (Evolved-UMTS Terrestrial Radio Access Network). Each of the plurality of radio base stations eNB forms a cell that is a communication area where a service should be provided to the radio terminal UE. The radio terminal UE is a radio communication device which the user has, and it is also called as "User Equipment".

Each of the adjacent radio base stations eNB can communicate mutually via an X2 interface which is a logical communication channel to provide communication between the base stations. Each of the plurality of radio base stations eNB can communicate with the EPC (Evolved Packet Core), more specifically, with the MME (Mobility Management Entity)/S-GW (Serving Gateway) via an S1 interface. Further, each radio base station eNB can communicate with the maintenance monitoring device OAM managed by the operator.

Note that E-UTRAN and the maintenance monitoring device OAM are together called as "Network" in the following, where appropriate. However, a radio access network such as a different radio communication system (RAT: Radio Access Technology) can also be included in the "Network".

The mobile communication system 1 supports a record-type MDT (called "Logged MDT"). Record-type MDT is a type of test in which the radio terminal UE in the idle state performs a measurement when a set condition is satisfied, and a measurement log including the measurement result is later reported to the network. A radio environment is measured and collected under the record-type MDT as follows:

Initially, the network transmits an IdleMDTConfiguration message that is a measurement setting message to set the measurement configuration, to the radio terminal UE. The measurement configuration includes measurement objects (measurements to be logged), a measurement trigger (triggering of logging event), a measurement time (total duration of logging), a time stamp (network absolute time stamp), and measurement areas (measurements area). However, the measurement area need not be included in the measurement configuration. Note that the measurement configuration may also be called as the MDT Configuration.

Secondly, the radio terminal UE, in an idle state and in the measurement time, measures the radio environment according to the IdleMDTConfiguration message and retains the measurement log which includes the result of this measurement. Specifically, the radio terminal UE activates a timer (duration timer) of the measurement period at the time of setting the measurement configuration according to the IdleMDTConfiguration message and terminates the recording of the measurement log when the timer expires. Note that the radio environment refers to a reference signal received power (RSRP) and a reference signal reception quality (RSRQ). Further, the measurement log can also include location information and a time stamp in addition to the measurement result of the radio environment. The location information refers to ECGI information, GNSS (GPS) information, or an RF fingerprint of a serving cell.

Thirdly, when the radio terminal UE shifts from the idle state (RRC Idle state) to the connected state (RRC Connected state), the radio terminal UE transmits log retaining information (called Availability Indicator) which shows that the measurement log is retained, to the network. Specifically, the radio terminal UE transmits RRCConnectionSetupComplete message, which shows that the establishment of the connected state is completed and also includes the log retaining information, to the network.

Fourthly, based on the received log retaining information, the network transmits a UEInformationRequest message which is a request message to request a measurement log report to the radio terminal UE. When the radio terminal UE receives the UEInformationRequest message, the radio terminal UE transmits the UEInformationResponse message including the retained measurement log to the network.

In case of the record-type MDT, it is not possible to set a plurality of measurement configurations to the radio terminal UE at the same time. Therefore, when the radio terminal UE, which retains the measurement log, receives a new measurement configuration message from the network and thereby sets a new measurement configuration, then in that case, the radio terminal UE replaces the set measurement configuration with the new measurement configuration and deletes the retained measurement log as well.

Note that the measurement configuration may be set in the radio terminal UE with RAT which is different from E-UTRAN. The radio terminal UE does not transmit the log retaining information in RAT which is different from the RAT to which the measurement configuration is set. Therefore, irrespective of the radio terminal UE retaining the measurement log, E-UTRAN may set a new measurement configuration to the radio terminal UE.

Accordingly, in the first embodiment, the E-UTRAN (radio base station eNB) inhibits the loss of the measurement log by transmitting the UEInformationRequest message as a predetermined message to the radio terminal UE before transmitting the IdleMDTConfiguration message even if the log retaining information is not received from the radio terminal UE.

(1.2) Configuration of Radio Base Station

FIG. 2 is a block diagram showing the configuration of the radio base station eNB.

As shown in FIG. 2, the radio base station eNB includes an antenna 101, a radio communication unit 110, a network communication unit 120, a storage unit 130, and a control unit 140.

The antenna 101 is used for the transmission and reception of a radio signal. The radio communication unit 110 is configured by using a radio frequency (RF) circuit, a base band (BB) circuit, etc., and transmits and receives the radio signal via the antenna 101. Further, the radio communication unit 110 modulates the transmission signal and demodulates the reception signal. The network communication unit 120 communicates with other network devices (the maintenance monitoring device OAM, the other radio base stations eNB, etc.). The storage unit 130 is configured by using, for example, a memory, and stores various information used for controlling the radio base stations eNB. The control unit 140 is configured by using, for example, a CPU, and controls various functions provided in the radio base stations eNB.

The control unit 140 includes a measurement control unit 141 and a log acquisition processing unit 142.

When setting of the measurement configuration in the radio terminal UE (selected by the network) is determined, then the measurement control unit 141 generates the IdleMDTConfiguration message which sets the measurement configuration. Next, the measurement control unit 141 controls the radio communication unit 110 so that this IdleMDTConfiguration message is transmitted to the radio terminal UE.

The log acquisition processing unit 142 carries out a process of acquiring the measurement log from the radio terminal UE. The log acquisition processing unit 142 generates the UEInformationRequest message before the transmission of the IdleMDTConfiguration message and controls the radio communication unit 110 so that the generated UEInformationRequest message is transmitted to the radio terminal UE. When the radio communication unit 110 receives the UEInformationResponse message transmitted (reported) from the radio terminal UE in response to the UEInformationRequest message, the log acquisition processing unit 142 acquires the measurement log which is included in the received UEInformationResponse message.

Next, the log acquisition processing unit 142 controls the network communication unit 120 so that the acquired measurement log is transmitted to the maintenance monitoring device OAM. Note that the log acquisition processing unit 142 is not just limited to be used for the transmission of the measurement log to the maintenance monitoring device OAM and can be used to interpret the contents of this measurement log and to adjust a parameter of its own radio base station eNB.

(1.3) Configuration of Radio Terminal

FIG. 3 is a block diagram showing the configuration of the radio terminal UE.

As shown in FIG. 3, the radio terminal UE includes an antenna 201, a radio communication unit 210, a user interface unit 220, a GPS receiver 230, a battery 240, a storage unit 250, and a control unit 260. However, the radio terminal UE need not include the GPS receiver 230.

The antenna 201 is used for the transmission and reception of a radio signal. The radio communication unit 210 is configured by using a radio frequency (RF) circuit, a base band (BB) circuit, etc., and transmits and receives the radio signal via the antenna 201. Further, the radio communication unit 210 modulates the transmission signal and demodulates the reception signal. The user interface unit 220 is a display, a button, etc., which function as an interface with the user. The battery 240 stores the power which is supplied to each block of the radio terminal UE. The storage unit 250 is configured using, for example, a memory, and stores various information used for controlling the radio terminal UE, etc. The control unit 260 is configured, for example, using a CPU, and controls various functions provided in the radio terminal UE.

The control unit 260 includes a measurement processing unit 261 and a measurement information management unit 262.

In the connected state, when the radio communication unit 210 receives the IdleMDTConfiguration message then the measurement processing unit 261 sets (in other words, stores in the storage unit 250) the measurement configuration included in the received IdleMDTConfiguration message.

In the idle state, the measurement processing unit 261 measures the radio environment and acquires location information, for example, according to the measurement configuration stored in the storage unit 250, and also retains (in other words, stores in the storage unit 250) the measurement log including the measurement result and the location information and the like. Specifically, the measurement processing unit 261 measures with the frequency specified by the measurement object (measurements to be logged) and the trigger specified by the measurement trigger (triggering of logging event). Further, the measurement processing unit 261 measures only when camping in cell ID or a tracking area specified by the measurements area.

Further, the measurement processing unit 261 activates a measurement period timer (duration timer) at the time of setting of the measurement configuration, and terminates the recording of the measurement log when the timer expires.

The measurement information management unit 262 manages the measurement configuration and the measurement log which are retained in the storage unit 250. Further, the measurement information management unit 262 deletes the measurement configuration when the measurement period timer (duration timer) expires. Further, while retaining the measurement configuration and the measurement log, if the measurement information management unit 262 receives a new measurement configuration message from the network and thereby sets a new measurement configuration, then in that case, the measurement information management unit 262 replaces with the new measurement configuration and also deletes the retained measurement log.

When the measurement log is retained in the storage unit 250 and the shift from the idle state to the connected state is completed, then the measurement information management unit 262 controls the radio communication unit 210 so that the RRCConnectionSetupComplete message, which shows that the shift from the idle state to the connected state is completed, is transmitted including the log retaining information which shows that the measurement log is retained. However, in a case of RAT which is different from the RAT to which the measurement configuration is set, the measurement information management unit 262 controls so that the log retaining information is not transmitted.

In the connected state, when the radio communication unit 210 receives the UEInformationRequest message, then the measurement information management unit 262 acquires the measurement log and generates the UEInformationResponse message including this acquired measurement log. Next, the measurement information management unit 262 controls the radio communication unit 210 so that the generated UEInformationResponse message is transmitted to the network (radio base station eNB). In this way, when the measurement log is reported to the network, the measurement information management unit 262 deletes the measurement log stored in the storage unit 250.

Note that in a case where it is not possible to report the measurement log to the network within 48 hours from the expiry of the measurement period timer then the measurement information management unit 262 can delete this measurement log.

(1.4) Radio Measurement Collection Method

FIG. 4 is a sequence chart showing the radio measurement collection method according to the first embodiment. In this sequence, the case where the measurement configuration is set in the radio terminal UE with RAT which is different from E-UTRAN, is described. The radio terminal UE does not transmit the log retaining information (Availability Indicator) in RAT which is different from the RAT to which the measurement configuration is set. Therefore, irrespective of the radio terminal UE retaining the measurement log, E-UTRAN can set a new measurement configuration to the radio terminal UE.

As shown in FIG. 4, in step S101, the radio terminal UE receives the IdleMDTConfiguration message from RAT which is different from E-UTRAN.

When the radio terminal UE receives the IdleMDTConfiguration message, the radio terminal UE sets the measurement configuration which is included in the received IdleMDTConfiguration message to its own radio terminal UE in step S102.

In step S103, the radio terminal UE shifts from the connected state to the idle state.

In step S104, the radio terminal UE in the idle state measures the radio environment according to the set measurement configuration and retains the measurement log which includes the results of this measurement.

In step S105, the radio terminal UE carries out the connection process with the radio base station eNB.

In step S106, the radio terminal UE shifts from the idle state to the connected state.

In step S107, the radio terminal UE transmits the RRCConnectionSetupComplete message which shows that the radio terminal UE has completed the transition from the idle state to the connected state, to the radio base station eNB. Note that since the RAT is different from the RAT to which the measurement configuration is set, the radio terminal UE does not transmit the log retaining information (Availability Indicator).

In step S108, the radio base station eNB determines to set the measurement configuration to the radio terminal UE, according to the instructions from, for example, the maintenance monitoring device OAM.

When the radio base station eNB determines to set the measurement configuration to the radio terminal UE, then in step S109, the radio base station eNB generates the UEInformationRequest message to request the transmission of the measurement log and transmits the generated UEInformationRequest message to the radio terminal UE.

When the UEInformationRequest message is received from the radio base station eNB, the radio terminal UE generates the UEInformationResponse message including the retained measurement log and transmits the generated UEInformationResponse message to the radio base station eNB in step S110. In this way, after the measurement log is reported to the network, the radio terminal UE deletes the retained measurement log. Note that when the radio base station eNB receives the UEInformationResponse message which includes the measurement log from the radio terminal UE, then the radio base station eNB acquires the measurement log included in the received UEInformationResponse message and transmits the acquired measurement log to the maintenance monitoring device OAM. The radio base station eNB may use this information (measurement log) for itself before transmitting the measurement log to the maintenance monitoring device OAM.

On the other hand, if the radio terminal UE does not retain the measurement log when it receives the UEInformationRequest message from the radio base station eNB, then in step S110, the radio terminal UE generates the UEInformationResponse message, which includes information to the effect that the measurement log is not retained and transmits this generated UEInformationResponse message to the radio base station eNB. Alternatively, instead of the UEInformationResponse message which includes information to the effect that the measurement log is not retained, the radio terminal UE may transmit a message to notify that the measurement log is not retained to the radio base station eNB.

In step S111, the radio base station eNB generates the IdleMDTConfiguration message which sets the measurement configuration and transmits this generated IdleMDTConfiguration message to the radio terminal UE.

When the IdleMDTConfiguration message is received from the radio base station eNB, the radio terminal UE replaces the retained measurement configuration with the new measurement configuration included in the IdleMDTConfiguration message, in step S112.

In this sequence, there is described a case where the measurement configuration is set with the RAT different from the E-UTRAN to the radio terminal UE, however a measurement configuration may be set to the radio terminal UE using the E-UTRAN.

(1.5) Effects of First Embodiment

As described above, according to the first embodiment, the radio terminal UE which retains the measurement log can transmit the retained measurement log to the radio base station eNB before receiving a new IdleMDTConfiguration message, even if the radio terminal UE sets a new measurement configuration when a new IdleMDTConfiguration message is received from the radio base station eNB. Thus, a loss of the measurement log can be inhibited.

Particularly, even if the log retaining information (Availability Indicator) is not received from the radio terminal UE, the radio base station eNB can more surely inhibit the loss of measurement log by transmitting the UEInformationRequest message to the radio terminal UE before the IdleMDTConfiguration message is transmitted.

(1.6) Modification of First Embodiment

In the first embodiment, there is described a case where if the radio terminal UE does not retain the measurement log when receiving the UEInformationRequest message from the radio base station eNB then not retaining the measurement log is notified to the radio base station eNB. In this modification, a case where if the radio terminal UE does not retain the measurement log when the radio terminal UE has received the UEInformationRequest message from the radio base station eNB, then the radio base station eNB is not notified of not retaining the measurement log is described.

FIG. 5 is a sequence chart showing the radio measurement collection method according to the modification of the first embodiment. The processes of steps S201 to S208 are the same as those in the first embodiment, and therefore, the processes of steps S209 and beyond will be described.

As shown in FIG. 5, when the radio base station eNB determines to set the measurement configuration to the radio terminal UE, then in step S209, the radio base station eNB generates the UEInformationRequest message to request the transmission of the measurement log and transmits this generated UEInformationRequest message to the radio terminal UE.

In step S210, when the UEInformationRequest message is transmitted to the radio terminal UE, the radio base station eNB activates the timer to measure a fixed time.

When the UEInformationRequest message is received from the radio base station eNB and retains the measurement log, the radio terminal UE generates the UEInformationResponse message including the retained measurement log and transmits this generated UEInformationResponse message to the radio base station eNB in step S211.

On the other hand, when the radio terminal UE receives the UEInformationRequest message from the radio base station eNB and the radio terminal UE does not retain the measurement log, the radio terminal UE omits the transmission of the UEInformationResponse message.

When the timer described above expires, the radio base station eNB generates the IdleMDTConfiguration message which sets the measurement configuration and transmits this generated IdleMDTConfiguration message to the radio terminal UE in step S212.

When the IdleMDTConfiguration message is received from the radio base station eNB, the radio terminal UE replaces the retained measurement configuration with the new measurement configuration included in the IdleMDTConfiguration message, in step S213.

Thus, according to this modification, when the radio terminal UE receives the UEInformationRequest message from the radio base station eNB and does not retain the measurement log, the radio terminal UE omits the transmission of the UEInformationResponse message. As a result, a radio resource required for the transmission of the UEInformationResponse message can be saved as compared to the first embodiment.

(2) Second Embodiment

In the first embodiment, the radio base station eNB transmits the UEInformationRequest message as a predetermined message to the radio terminal UE before transmitting the IdleMDTConfiguration message. In the second embodiment, the radio base station eNB transmits an MDTConfigurationSetup message as a predetermined message to the radio terminal UE before transmitting the IdleMDTConfiguration message. The MDTConfigurationSetup message is a message which requests the transmission of the information that indicates the retaining state of the measurement log in the radio terminal UE.

In the second embodiment, differences from the first embodiment are described and repeated descriptions will be omitted. (2.1) Configuration of Radio Base Station and Radio Terminal, (2.2) Radio measurement collection method, (2.3) Effect of Second Embodiment, (2.4) First Modification of Second Embodiment, (2.5) Second Modification of Second Embodiment are described below.

(2.1) Configuration of Radio Base Station and Radio Terminal

Again with reference to FIG. 2, the differences between the radio base station eNB according to the second embodiment and that according to the first embodiment are described.

In the radio base station eNB according to the second embodiment, the log acquisition processing unit 142 carries out a process of acquiring the measurement log from the radio terminal UE. The log acquisition processing unit 142 generates the MDTConfigurationSetup message before the transmission of the IdleMDTConfiguration message and controls the radio communication unit 110 so that this generated MDTConfigurationSetup message is transmitted to the radio terminal UE. Further, the log acquisition processing unit 142 transmits the MDTConfigurationSetup message, and thereafter, the radio communication unit 110 receives the MDTConfigurationSetupResponse message including the information of whether the measurement log is retained, from the radio terminal UE. When the radio communication unit 110 receives the MDTConfigurationSetupResponse message from the radio terminal UE and the message includes the information to the effect that the measurement log is retained, then the log acquisition processing unit 142 generates the UEInformationRequest message and controls the radio communication unit 110 so that this generated UEInformationRequest message is transmitted to the radio terminal UE. Then, the log acquisition processing unit 142 acquires the measurement log included in the received UEInformationResponse message when the radio communication unit 110 receives the UEInformationResponse message which is transmitted (reported) by the radio terminal UE.

Again with reference to FIG. 3, the differences between the radio terminal UE according to the second embodiment and that according to the first embodiment are described.

In the radio terminal UE according to the second embodiment, when the radio communication unit 210 receives the MDTConfigurationSetup message, then in the connected state, the measurement information management unit 262 generates the MDTConfigurationSetupResponse message which indicates whether the measurement log is retained or not and controls the radio communication unit 210 so that this generated MDTConfigurationSetupResponse message is transmitted to the radio base station eNB.

Note that the measurement information management unit 262 may include capability information which indicates a capability of the radio terminal UE, in the MDTConfigurationSetupResponse message. The capability of the radio terminal UE refers to, for example, an available memory, a remaining battery amount, presence or absence of GPS, etc. Before transmitting the IdleMDTConfiguration message, since the capability information is included in the MDTConfigurationSetupResponse message, so that the network is able to understand the capability of the radio terminal UE, and therefore it becomes possible to transmit the IdleMDTConfiguration message suitable to the capability of the radio terminal UE from the network to the radio terminal UE.

(2.2) Radio Measurement Collection Method

Figure 6:
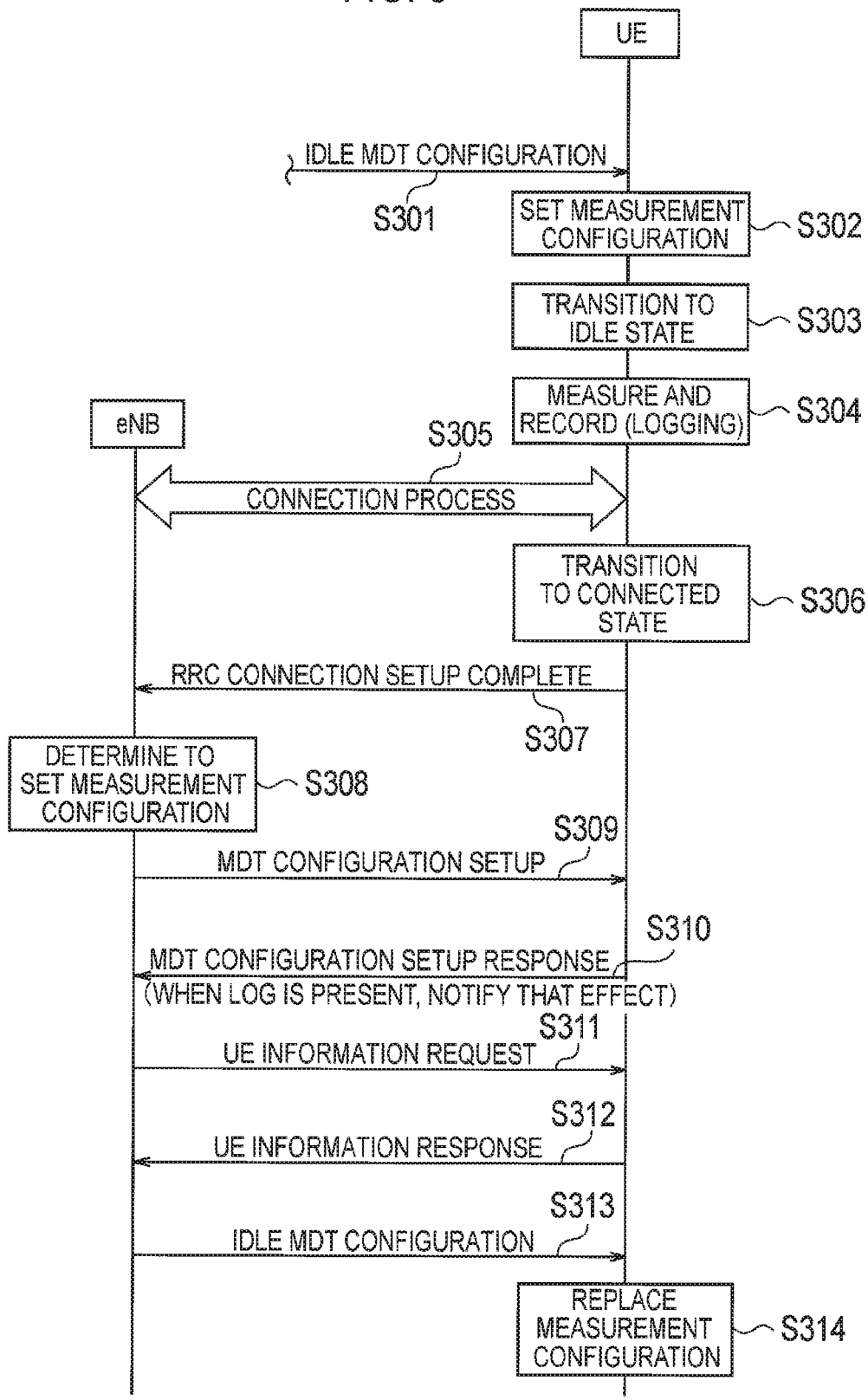
FIG. 6 is a sequence chart showing a radio measurement collection method according to a second embodiment.

FIG. 6 is a sequence chart showing the radio measurement collection method according to the second embodiment. The processes of the steps S301 to S308 are the same as those in the first embodiment, and therefore the processes of steps S309 and beyond will be described.

As shown in FIG. 6, when the radio base station eNB determines to set the measurement configuration to the radio terminal UE, then in step S309, the radio base station eNB generates the MDTConfigurationSetup message and transmits this generated MDTConfigurationSetup message to the radio terminal UE.

When the radio terminal UE receives the MDTConfigurationSetup message, then in the step S310, the radio terminal UE generates the MDTConfigurationSetupResponse message which indicates whether the measurement log is retained or not and then transmits this generated MDTConfigurationSetupResponse message to the radio base station eNB. In this case, it is assumed that the radio terminal UE has transmitted the MDTConfigurationSetupResponse message which indicates that the measurement log is retained. Note that the radio terminal UE may make a transmission with the capability information which shows the capability of radio terminal UE included in the MDTConfigurationSetupResponse message.

When the radio base station eNB receives the MDTConfigurationSetupResponse message which indicates that the measurement log is retained, then in the step S311, the radio base station eNB generates the UEInformationRequest message requesting the transmission of the measurement log and transmits this generated UEInformationRequest message to the radio terminal UE. When the capability information is included in the MDTConfigurationSetupResponse message, the radio base station eNB may transmit the capability information to the maintenance monitoring device OAM.

In step S312, when the UEInformationRequest message is received from the radio base station eNB, the radio terminal UE generates a UEInformationResponse message which includes the retained measurement log and transmits the generated UEInformationResponse message to the radio base station eNB.

When the radio base station eNB receives the UEInformationResponse message which includes the measurement log from the radio terminal UE, then the radio base station eNB acquires the measurement log included in the received UEInformationResponse message and transmits the acquired measurement log to the maintenance monitoring device OAM. The radio base station eNB may use this information (measurement log) for itself before transmitting the measurement log to the maintenance monitoring device OAM.

In step S313, the radio base station eNB generates the IdleMDTConfiguration message which sets the measurement configuration and transmits this generated IdleMDTConfiguration message to the radio terminal UE. Note that the radio base station eNB may generate the IdleMDTConfiguration message in consideration of the capability information, when the capability information is included in the MDTConfigurationSetupResponse message.

When the IdleMDTConfiguration message is received from the radio base station eNB, the radio terminal UE replaces the retained measurement configuration with the new measurement configuration included in the IdleMDTConfiguration message, in step S314.

(2.3) Effect of Second Embodiment

As described above, according to the second embodiment, the radio terminal UE which retains the measurement log can transmit the retained measurement log to the radio base station eNB, before receiving a new IdleMDTConfiguration message, even when the radio terminal UE receives a new IdleMDTConfiguration message from the radio base station eNB and sets the new measurement configuration. Thus, a loss of the measurement log can be inhibited.

Particularly, even if the log retaining information (Availability Indicator) is not received from the radio terminal UE, the radio base station eNB can more surely inhibit the loss of the measurement log by transmitting the MDTConfigurationSetup message to the radio terminal UE before the IdleMDTConfiguration message is transmitted.

Further, when the capability information which indicates the capability of the radio terminal UE is included in the MDTConfigurationSetupResponse message, the network (radio base station eNB) can transmit the IdleMDTConfiguration message suitable to the capability of the radio terminal UE to the radio terminal UE and thus an effective radio measurement and collection can be achieved.

(2.4) First Modification of Second Embodiment

In the second embodiment, when the radio terminal UE receives the MDTConfigurationSetup message and retains the measurement log, the MDTConfigurationSetupResponse message which indicates that the measurement log is retained is transmitted. However, in this modification, when the radio terminal UE receives the MDTConfigurationSetup message and retains the measurement log, the MDTConfigurationSetupResponse message including the measurement log is transmitted.

Figure 7:
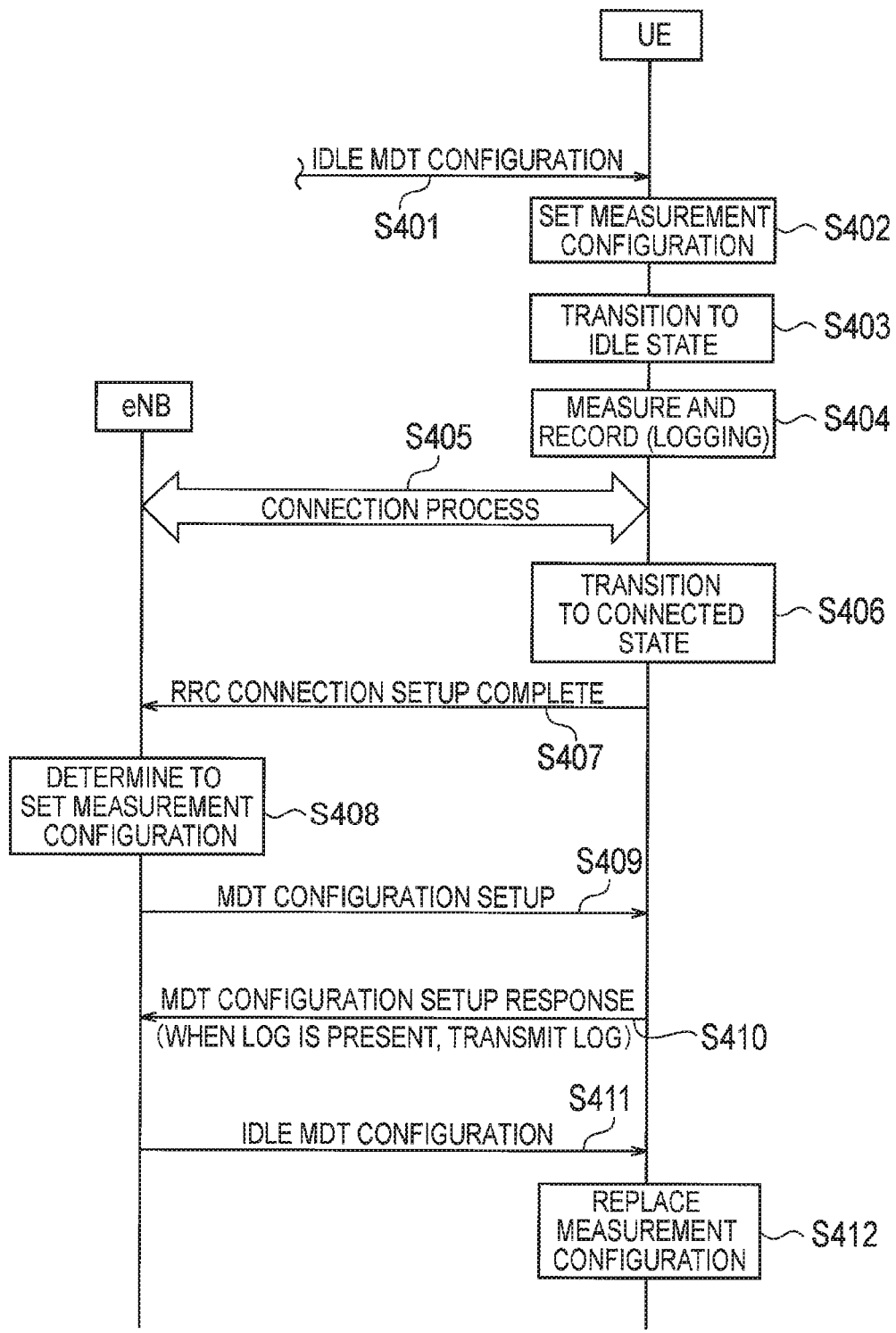
FIG. 7 is a sequence chart showing a radio measurement collection method according to a first modification of the second embodiment.

FIG. 7 is a sequence chart showing a radio measurement collection method according to a first modification of the second embodiment. The processes of steps S401 to S408 are the same as those in the second embodiment, and therefore, the processes of step S409 and beyond will be described.

As shown in FIG. 7, when the radio base station eNB determines to set the measurement configuration to the radio terminal UE, then in step S409, the radio base station eNB generates the MDTConfigurationSetup message and transmits this generated MDTConfigurationSetup message to the radio terminal UE.

When the radio terminal UE receives the MDTConfigurationSetup message, then in the step S410, the radio terminal UE generates the MDTConfigurationSetupResponse message and transmits this generated MDTConfigurationSetupResponse message to the radio base station eNB. Here, the radio terminal UE generates the MDTConfigurationSetupResponse message which includes the measurement log when the measurement log is retained. On the other hand, when the radio terminal UE does not retain the measurement log, an MDTConfigurationSetupResponse message on that effect that the radio terminal UE does not retain the measurement log is generated. Note that if the measurement log is not retained, the radio terminal UE transmits the MDTConfigurationSetupResponse message without including the measurement log, however, the radio base station eNB may take a technique to regard that the radio terminal UE does not retain the log unless the measurement log is included in the MDTConfigurationSetupResponse message. In this case, it is assumed that the radio terminal UE generates the MDTConfigurationSetupResponse message which includes the measurement log. Note that the radio terminal UE may make a transmission with the capability information which shows the capability of radio terminal UE included in the MDTConfigurationSetupResponse message.

When the radio base station eNB receives the MDTConfigurationSetupResponse message, in step S411, the radio base station eNB generates an IdleMDTConfiguration message which sets the measurement configuration and transmits this generated IdleMDTConfiguration message to the radio terminal UE. Note that the radio base station eNB may generate the IdleMDTConfiguration message in consideration of the capability information when the capability information is included in the MDTConfigurationSetupResponse message.

When the IdleMDTConfiguration message is received from the radio base station eNB, the radio terminal UE replaces the retained measurement configuration with the new measurement configuration included in the IdleMDTConfiguration message, in step S412.

Thus, according to this modification, when the radio terminal UE receives the MDTConfigurationSetup message and retains the measurement log, the radio terminal UE transmits the measurement log included in the MDTConfigurationSetupResponse message. As a result, the radio resource required for the transmission of the UEInformationRequest message and the UEInformationResponse message can be saved as compared to the first embodiment.

(2.5) Second Modification of Second Embodiment

In this modification, similar to the modification of the first embodiment, a mode in which the timer is used is described.

Figure 8:
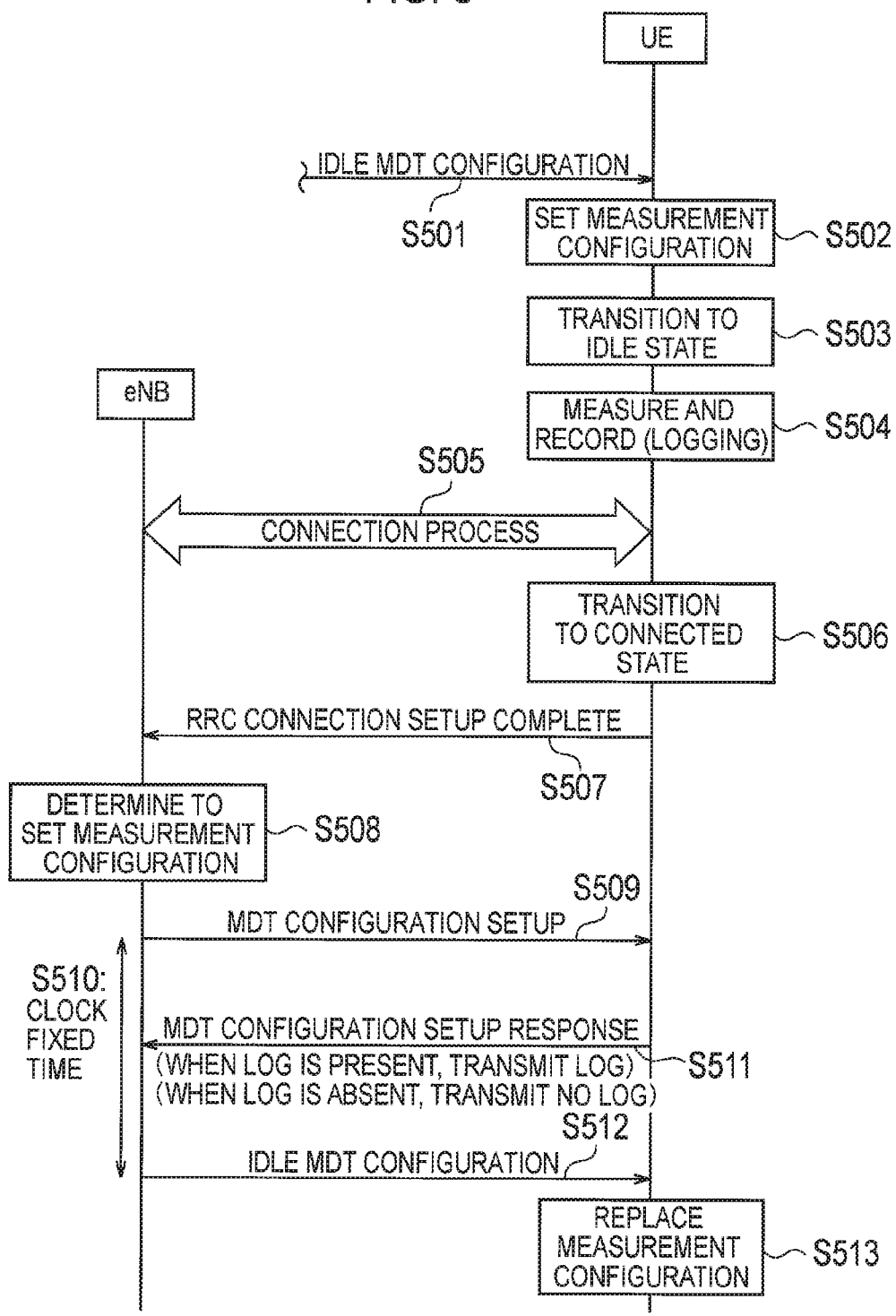
FIG. 8 is a sequence chart showing a radio measurement collection method according to a second modification of the second embodiment.

FIG. 8 is a sequence chart showing a radio measurement collection method according to a second modification of the second embodiment. Since the processes of step S501 to step S508 are similar to those in the second embodiment, processes from steps S509 and beyond are described.

As shown in FIG. 8, when the radio base station eNB determines to set the measurement configuration to the radio terminal UE, then in step S509, the radio base station eNB generates the MDTConfigurationSetup message and transmits this generated MDTConfigurationSetup message to the radio terminal UE.

In step S510, when the MDTConfigurationSetup message is transmitted to the radio terminal UE, the radio base station eNB activates the timer to measure the fixed time.

When the radio terminal UE receives the MDTConfigurationSetup message from the radio base station eNB and retains the measurement log, in the step S511, the radio terminal UE generates the MDTConfigurationSetupResponse message including the retained measurement log and then transmits this generated MDTConfigurationSetupResponse message to the radio base station eNB. Note that the radio terminal UE may make a transmission with the capability information which shows the capability of the radio terminal UE included in the MDTConfigurationSetupResponse message.

On the other hand, when the radio terminal UE receives the MDTConfigurationSetup message from the radio base station eNB and does not retain the measurement log, the radio terminal UE transmits the MDTConfigurationSetupResponse message without including the measurement log.

When the timer described above expires, the radio base station eNB generates the IdleMDTConfiguration message which sets the measurement configuration and transmits this generated IdleMDTConfiguration message to the radio terminal UE in step S512. Note that the radio base station eNB may generate the IdleMDTConfiguration message in consideration of the capability information when the capability information is included in the MDTConfigurationSetupResponse message.

When the IdleMDTConfiguration message is received from the radio base station eNB, the radio terminal UE replaces the retained measurement configuration with the new measurement configuration included in the IdleMDTConfiguration message, in step S513.

(3) Other Embodiments

In other embodiments, a case where the record-type MDT (Logged MDT) is carried out between the different RATS is described. Further, in the other embodiments, the radio terminal is simply referred as "UE", the radio base station as "(e)NB", and the measurement log as "Logged MDT data" or "Logged data". Note that the RAT means a radio access technology. Examples of "among the different RATs" include between an LTE system and a WCDMA system, between an LTE system and a GSM system, and between an LTE system and an EVDO system.

(3.1) Introduction

In the Logged MDT, it is already determined that a setting (configuration), a measurement and collection, and a report regarding a measurement are always performed in a cell of the similar RAT type. For Logged MDT, only one RAT specific configuration exists in the UE. When the network provides the configuration, the already configured MDT measurement configuration is replaced with a new configuration, as a whole. Further, at the same time, the measurement log corresponding to the already configured MDT measurement configuration is deleted. Whether to retrieve the relevant data before providing the new configuration is decided solely by the network. Note that the network may need to carry out inter RAT cooperation.

The UE which is configured so as to carry out the Logged MDT measurement indicates the availability of the Logged MDT data, by way of a 1-bit indicator in the RRCConnectionSetupComplete message, during establishing the connection. In a case of connection to the RAT which is configured to carryout the Logged MDT measurement for the UE and even if the logging period is not terminated, the UE includes this indication in the message every time the UE shifts to an RCC Connected mode. The UE does not notify the availability of the MDT measurements of the other RATs. On the basis of this indication, the network can determine the retrieval of the measurement log.

(3.2) Considerations

Some operators do not desire a Logged MDT data deletion when there are no chances to retrieve the data in the network. However, in reality, it has been determined not to transmit the availability indicator in the other RATs and it is assumed that the retrieval of the log data is taken care solely by the network.

Three options are recommended for the retrieval and configuration handling in the inter RAT scenarios. In these inter RAT scenarios, it is assumed that the UE is connected to RAT-A and an MDT configuration has already been set. The UE goes into an idle state and shifts to the target RAT (RAT-B). The UE may or may not have MDT measurement data of RAT-A before shifting to RAT-B. The RAT-B network deletes the entire measurement log when a new MDT configuration is set for the UE which resets the MDT configuration of the new RAT-B for the UE. Without additional information, it may be possible that the RAT-B network carelessly replaces the MDT action which is being executed and deletes the useful UE log data.

(3.2.1) Options for Inter RAT Data Retrieval and Configuration (Re-Configuration)

Below, are three options for the retrieval and configuration handling in the inter RAT scenarios.

(3.2.1.1) Option 1

Figure 9:
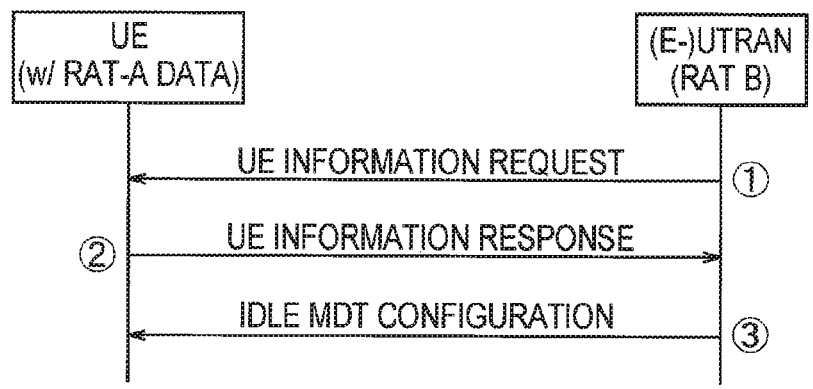
FIG. 9 is a sequence chart showing a radio measurement collection method according to Option 1 of other embodiments.

As shown in FIG. 9, in Option 1, the existing protocols are used for data retrieval and MDT configuration (re-configuration).

1. In step 1, (e) NB transmits a UEInformationRequest message to the UE in order to retrieve the recorded MDT data (if exists). According to the assumption described above, the UEInformationRequest message is sent to the UE only when the (e) NB receives the availability indicator. Since the UE does not transmit an availability indicator for the (e)NB of RAT-B, it may be assumed as a "blind" request. However, according to the degree of inter RAT cooperation used between RAT-A and RAT-B, the request can be transmitted on the basis of the UE setting state information from the RAT-A to the RAT-B. The (e) NB can select whether to transmit this request before MDT re-configuration. In this way, according to the UE setting state information from the RAT-A to the RAT-B, the RAT-B can determine whether to perform a new configuration for this UE by notifying the information such as the UE is carrying out Logged MDT for the RAT-A or the UE has Logged MDT data for the RAT-A.

2. If the UE has Logged MDT data, then by using a UEInformationResponse message, this data is sent to the (e)NB. Even if there is no utilizable data, the UE needs to transmit this message along with an indication that utilizable MDT data does not exist. Therefore, the UEInformationResponse message is updated in order to represent that the utilizable MDT data does not exist.

3. The (e) NB transmits the IdleMDTConfiguration message in order to re-configure a new RAT-B configuration in the UE.

(3.2.1.2) Option 2

Figure 10:
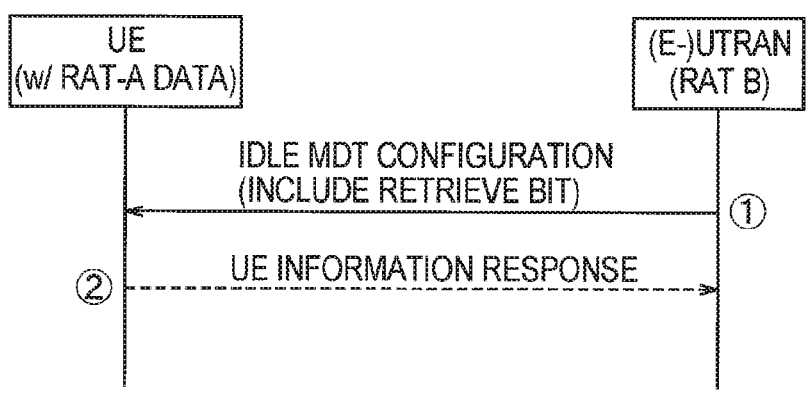
FIG. 10 is a sequence chart showing a radio measurement collection method according to Option 2 of the other embodiments.

As shown in FIG. 10, in Option 2, the IdleMDTConfiguration message is used for both the Logged MDT data request and MDT configuration (re-configuration).

1. In step 1, (e) NB transmits IdleMDTConfiguration message to UE for re-configuring a new RAT-B configuration in the UE. The UE replaces the RAT-A MDT configuration with the RAT-B MDT configuration. Furthermore, the (e)NB can request to transmit the remaining Logged MDT data in the UE to the (e)NB by using the "retrieve bit".

2. If the UE has utilizable Logged MDT data, then by using a UEInformationResponse message, this data is sent to the (e) NB. Even if there is no utilizable data, the UE needs to transmit this message along with an indication that utilizable MDT data does not exist. The UEInformationResponse message may need to be updated in order to represent that the utilizable MDT data does not exist.

(3.2.1.3) Option 3

Figure 11:
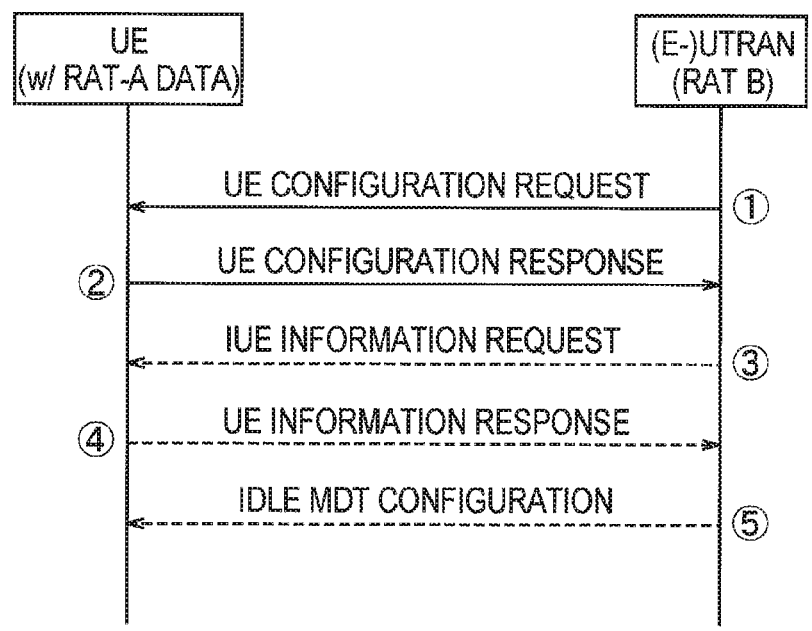
FIG. 11 is a sequence chart showing a radio measurement collection method according to Option 3 of the other embodiments.

As shown in FIG. 11, in Option 3, to determine whether the UE has an MDT configuration, the UE Configuration Request/Response message is added to the existing protocol.

1. In step 1, the UE Configuration Request message is transmitted to the UE for requesting its MDT configuration state (for example, whether UE has an MDT configuration or not).

2. In step 2, the UE transmits the UE Configuration Response message to (e)NB in order to notify the (e)NB whether the MDT configuration exists or not (Yes/No). If the UE response is "Yes", the (e) NB can select not to overwrite the MDT configuration from RAT-A.

3. In step 3, the (e) NB transmits the UEInformationRequest message to the UE in order to retrieve the Logged MDT data remaining in the UE. Even if the UE response is "No" (for example, MDT configuration does not exist) in step 2, the (e)NB can transmit the UEInformationRequest message to the UE so that the UE can retain Logged MDT data for at least 48 hours after completing the MDT activity. Alternatively, if the request for MDT data is made a part of the UEConfigurationRequest message, then step 3 can be eliminated.

4. If the UE has utilizable Logged MDT data, then by using the UEInformationResponse message, this data is sent to the (e) NB. Even if there is no utilizable data, the UE needs to transmit this message along with an indication that utilizable MDT data does not exist. The UEInformationResponse message may need to be updated in order to indicate that there is no utilizable MDT data. However, if the request for the MDT data is sent as a part of a UE Configuration Request message, then the UE may not need to transmit the UEInformationResponse message indicating that utilizable MDT data may not exist.

5. The (e) NB transmits the IdleMDTConfiguration message in order to re-configure a new RAT-B configuration in the UE. The UE replaces the RAT-A MDT Configuration with the RAT-B MDT Configuration.

(3.2.2) Comparison of Each Option

In all the three options, when network determines to set a new MDT configuration in the UE, measurement log (if exists) of the UE is not lost. In Option 1 and Option 2, the data retrieval is taken into account whereas, in Option 3, because it is checked whether the UE has an MDT configuration or not before re-configuring, both the data retrieval and an MDT re-configuration are considered.

The Option 1 uses existing protocols in the retrieval for MDT data. The request for the Logged MDT data can be carried out on the basis of information such that whether UE is participating in MDT activity which is being executed in RAT-A. When this type of information can not be used in RAT-B network, (e) NB can select not to request for Logged MDT data. Since in this mechanism the UEInformationRequest message is optional, there is no impact of signaling on operators not supporting inter RAT retrieval or (e) NB without inter RAT cooperation.

In the Option 2, the request for MDT data from UE is included in the IdleMDTConfiguration message. If the retrieval of MDT data is requested, then first of all UE updates its configuration with a new MDT configuration and then transmits the MDT data from RAT-A to (e) NB. This procedure differs from the procedure wherein the MDT data is deleted when the UE receives new MDT data. In this case, the UE does not delete the concerned data till the remaining data is sent to (e) NB. Since this option prevents the loss of data, it is advantageous as very little information needs to be added in the existing protocols during the MDT re-configuration. Further, data retrieval request is sent only as a part of necessity of setting a new MDT configuration in the UE. In this mechanism since the retrieve bit is included in the message as an option, the UEInformationRequest message is optional and therefore, there is no impact of signaling on (e) NB not having inter RAT cooperation or on operators not supporting inter RAT retrieval.

In the Option 3, in order to check the existence of MDT configuration to the UE, a new message is added to the existing protocols. This is advantageous as unnecessary replacement of the existing MDT configuration can be prevented even if inter RAT cooperation is not present. (e)NB can select other UE for MDT activity. The remaining protocols are similar to the Option 1.

The Option 3 also has other advantages. The UE used in MDT measurement for logging/reporting UE should notify capability combination in order to allow a careful selection of appropriate equipment so that network can perform specific measurements. Device capability may reflect the log storage capacity and battery capacity along with the logging, reporting of a specific failure and/or capability for measurements. Therefore, the UEConfigurationRequest/Response message can be extended in order to confirm the battery status and memory status of the UE before the MDT configuration.

(3.3) Summary

All the three options prevent the loss of Logged MDT data when the UE is connected to other RAT and a new MDT configuration is set.

What is claimed is:

1. A radio base station operable to transmit to a radio terminal a measurement configuration message for causing the radio terminal to perform a logging process of storing a measurement log including a measurement result of a radio environment, and to acquire the measurement log stored by the radio terminal, the radio base station comprising:
a receiver configured to receive, from the radio terminal, log storing information indicating that the measurement log is stored in the radio terminal; and
a transmitter configured to transmit, to the radio terminal, a log transmission request to request a transmission of the measurement log on the basis of the log storing information, wherein
the receiver is further configured to receive, from the radio terminal, a log transmission response for carrying the measurement log, and
the receiver is configured to receive, from the radio terminal, the log transmission response even when the measurement log is not stored in the radio terminal.

2. The radio base station according to claim 1, wherein the receiver is configured to receive the log storing information from the radio terminal after a transition to a connected state from an idle state of the radio terminal.

3. The radio base station according to claim 1, wherein the measurement configuration message includes a timer that defines duration of the logging process, and
the receiver is configured to receive, from the radio terminal, the log transmission response even when the measurement log is not stored in the radio terminal due to lapse of 48 hours after an expiry of the timer.

4. A method performed at a radio base station operable to transmit to a radio terminal a measurement configuration message for causing the radio terminal to perform a logging process of storing a measurement log including a measurement result of a radio environment, and to acquire the measurement log stored by the radio terminal, the method comprising:

receiving, from the radio terminal, log storing information indicating that the measurement log is stored in the radio terminal;

transmitting, to the radio terminal, a log transmission request to request a transmission of the measurement log on the basis of the log storing information; and receiving, from the radio terminal, a log transmission response for carrying the measurement log, wherein the radio base station receives, from the radio terminal, the log transmission response even when the measurement log is not stored in the radio terminal.

5. The method according to claim 4, wherein the radio base station receives the log storing information from the radio terminal after a transition to a connected state from an idle state of the radio terminal.

6. The method according to claim 4, wherein the measurement configuration message includes a timer that defines duration of the logging process, and the radio base station receives, from the radio terminal, the log transmission response even when the measurement log is not stored in the radio terminal due to lapse of 48 hours after an expiry of the timer.

* * * * *